(12) United States Patent
Causey

(10) Patent No.: US 7,828,364 B2
(45) Date of Patent: Nov. 9, 2010

(54) DURABLE SOFT-TOP VEHICLE COVER

(76) Inventor: Mark Edward Causey, 4475 Lake Ivanhoe Dr., Tucker, GA (US) 30084

( * ) Notice: Subject to any disclaimer, the term of this patent is extended or adjusted under 35 U.S.C. 154(b) by 300 days.

(21) Appl. No.: 12/077,578

(22) Filed: Mar. 19, 2008

(65) Prior Publication Data

US 2008/0231071 A1  Sep. 25, 2008

Related U.S. Application Data

(60) Provisional application No. 60/918,755, filed on Mar. 19, 2007.

(51) Int. Cl.
*B60J 7/10* (2006.01)
(52) U.S. Cl. ................................. 296/136.12
(58) Field of Classification Search ............... 280/756; 296/102, 104, 107.01, 107.09, 107.15, 109, 296/136.03, 136.12
See application file for complete search history.

(56) References Cited

U.S. PATENT DOCUMENTS

| | | | | |
|---|---|---|---|---|
| 139,450 A | * | 6/1873 | Bockstaller | 296/102 |
| 160,792 A | * | 3/1875 | Saunders | 296/104 |
| 222,650 A | * | 12/1879 | Beers | 296/102 |
| 1,061,547 A | * | 5/1913 | Kennedy et al. | 135/138 |
| 1,301,619 A | * | 4/1919 | Szemanski | 296/107.09 |
| 1,373,207 A | * | 3/1921 | Shaw | 296/102 |
| 1,472,651 A | * | 10/1923 | Holling | 296/138 |
| 1,600,533 A | * | 9/1926 | Bourgon | 296/214 |
| 2,463,646 A | * | 3/1949 | Schassberger | 296/104 |
| 3,050,334 A | * | 8/1962 | Geiger | 296/107.1 |
| 3,167,349 A | * | 1/1965 | Young et al. | 296/100.1 |
| 3,524,674 A | * | 8/1970 | Medeiros | 296/102 |
| 4,070,056 A | * | 1/1978 | Hickman | 296/148 |
| D259,340 S | * | 5/1981 | Stengel | D12/401 |
| 4,733,902 A | * | 3/1988 | Rabb | 296/39.3 |
| 4,858,985 A | * | 8/1989 | Wojcik | 296/136.03 |
| 5,052,747 A | * | 10/1991 | Kubota et al. | 296/219 |
| 5,094,316 A | * | 3/1992 | Rosen | 181/141 |
| 5,186,513 A | * | 2/1993 | Strother | 296/100.15 |
| 5,393,117 A | * | 2/1995 | Beale | 296/100.18 |
| 5,460,423 A | * | 10/1995 | Kersting et al. | 296/100.18 |
| D371,107 S | * | 6/1996 | Summers | D12/406 |

(Continued)

FOREIGN PATENT DOCUMENTS

EP          379821 A1  *   8/1990

(Continued)

*Primary Examiner*—Glenn Dayoan
*Assistant Examiner*—Paul A Chenevert
(74) *Attorney, Agent, or Firm*—Robert Z. Evora

(57) ABSTRACT

A durable soft-top cover used to cover the passenger compartment of a vehicle. The durable soft-top cover includes a rigid member that prevents the annoying and turbulent flapping of the soft-top at high rates of speed when the vehicle velocity and wind speed is increased. The durable soft-top cover is reinforced with rigid members that support the canvas-like material of the soft-top. The rigid members are disposed adjacent to and/or within a material making up the durable soft-top. The durable soft-top may be portably rolled and/or folded and compactly stored. The rigid construction may be composed of at least one or more rigid member to provide the rigidity to the durable soft-top.

18 Claims, 11 Drawing Sheets

U.S. PATENT DOCUMENTS

| | | | | |
|---|---|---|---|---|
| 5,992,917 A * | 11/1999 | Hilliard et al. | | 296/103 |
| 6,033,007 A * | 3/2000 | Hirschvogel et al. | | 296/107.11 |
| 6,170,901 B1 * | 1/2001 | Hartmann et al. | | 296/107.01 |
| 6,189,962 B1 * | 2/2001 | Henderson | | 296/218 |
| 6,241,305 B1 * | 6/2001 | Troeger et al. | | 296/102 |
| 6,309,007 B1 * | 10/2001 | Essig et al. | | 296/103 |
| 6,338,522 B1 * | 1/2002 | LeBlanc | | 296/107.01 |
| 6,409,248 B1 * | 6/2002 | Bores | | 296/122 |
| 6,439,643 B2 * | 8/2002 | Barker | | 296/116 |
| 6,505,880 B1 * | 1/2003 | Castro | | 296/102 |
| 6,543,841 B1 * | 4/2003 | Ohkubo | | 296/210 |
| 6,789,838 B1 * | 9/2004 | Rubin | | 296/152 |
| 7,021,695 B2 * | 4/2006 | Quindt et al. | | 296/107.12 |
| 7,025,404 B1 * | 4/2006 | Gilbert | | 296/102 |
| 7,240,960 B2 * | 7/2007 | Fallis et al. | | 296/218 |
| 2002/0014783 A1 * | 2/2002 | Nicastri | | 296/107.09 |
| 2005/0001446 A1 * | 1/2005 | Morley | | 296/102 |
| 2005/0280280 A1 * | 12/2005 | Heselhaus | | 296/107.15 |
| 2006/0076797 A1 * | 4/2006 | Gandemer et al. | | 296/107.01 |
| 2007/0018485 A1 * | 1/2007 | Jacobson | | 296/210 |
| 2007/0063531 A1 * | 3/2007 | Wezyk et al. | | 296/107.09 |
| 2007/0182199 A1 * | 8/2007 | Just | | 296/107.01 |
| 2007/0257521 A1 * | 11/2007 | Fallis et al. | | 296/218 |
| 2008/0106121 A1 * | 5/2008 | Lissner | | 296/190.1 |

FOREIGN PATENT DOCUMENTS

| | | | |
|---|---|---|---|
| JP | 63078811 A | * | 4/1988 |
| JP | 01164623 A | * | 6/1989 |
| JP | 02106433 A | * | 4/1990 |
| JP | 04260817 A | * | 9/1992 |
| JP | 05193363 A | * | 8/1993 |
| JP | 06156086 A | * | 6/1994 |
| WO | WO 9119618 A1 | * | 12/1991 |

* cited by examiner

FIG. 2
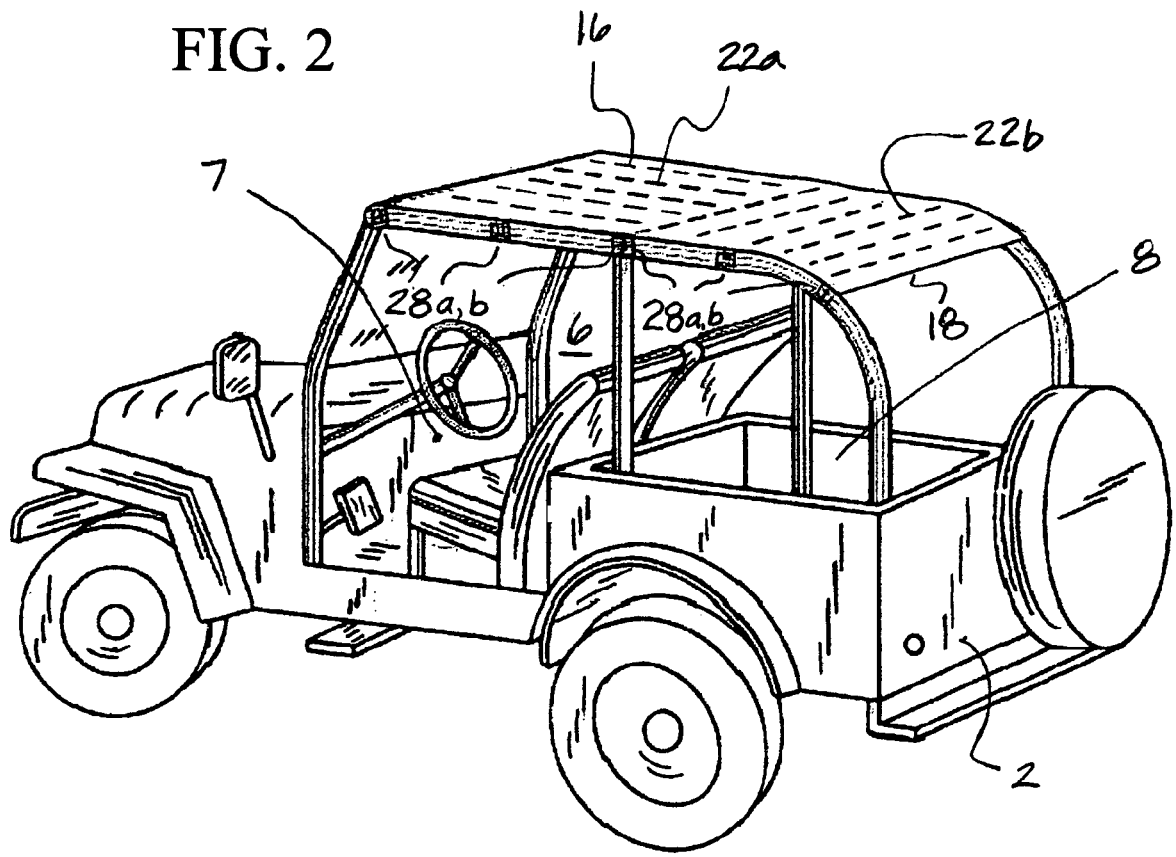
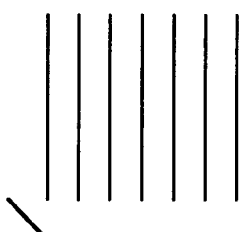
VERTICAL
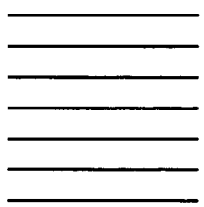
HORIZONTAL
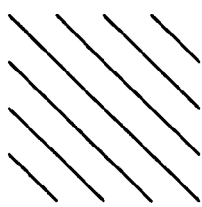
DIAGONAL
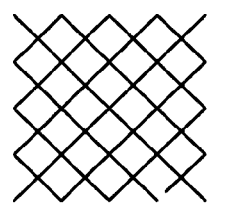
CRISS-CROSS
FIG. 3

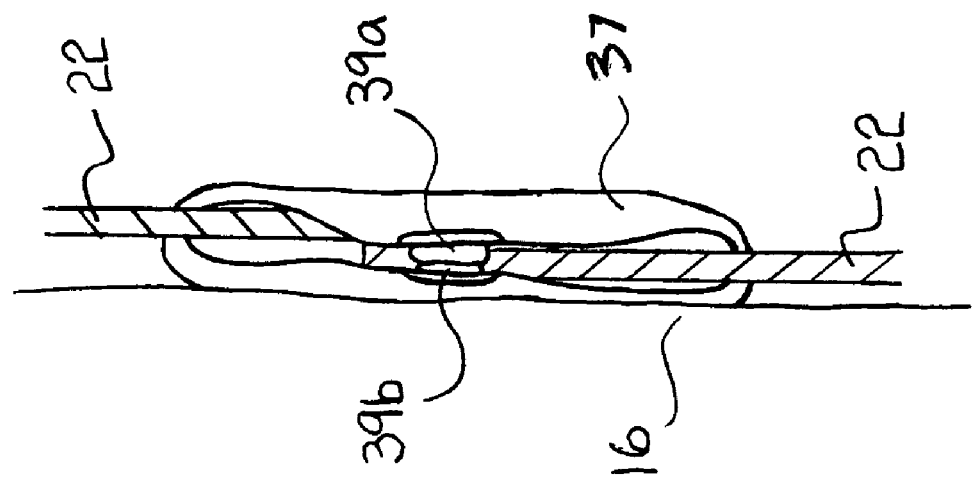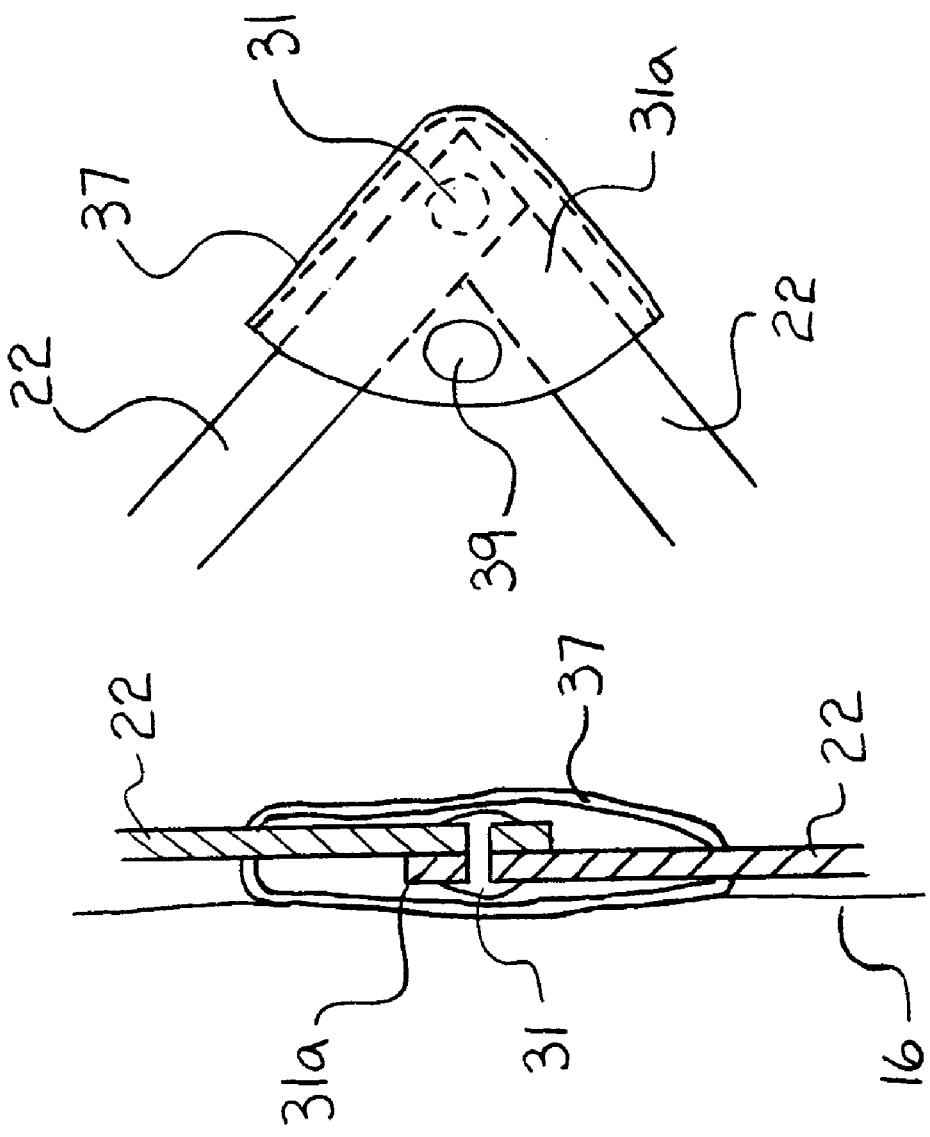
FIG. 13  FIG. 14  FIG. 15

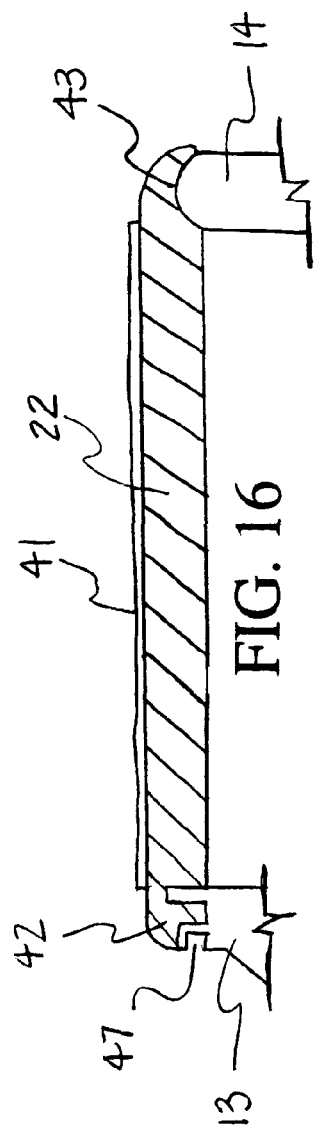
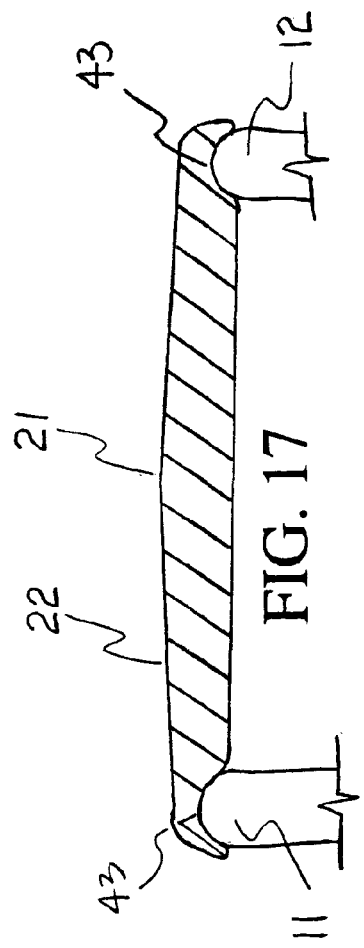
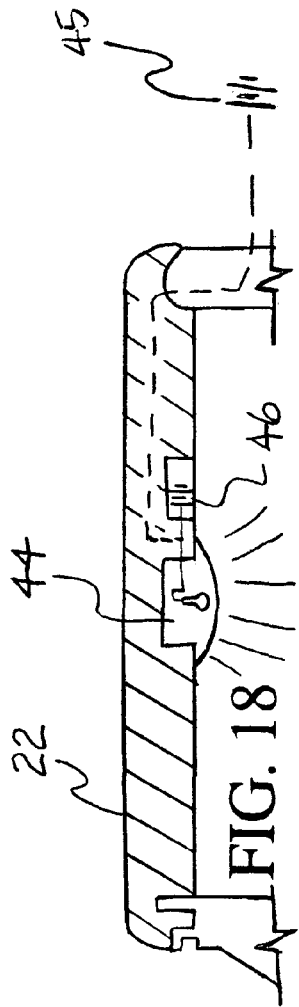

DURABLE SOFT-TOP VEHICLE COVER

CROSS REFERENCE TO RELATED APPLICATION

This application is a Non-Provisional Application which claims the benefit of the filing date of U.S. Provisional Application Ser. No. 60/918,755, entitled "Durable Soft-top Vehicle Cover" filed Mar. 19, 2007, the entirety of which is incorporated herein by reference.

BACKGROUND OF THE INVENTION

1. Field of the Invention

The invention relates to providing rigidity to a soft-top cover for a vehicle, and in particular to providing a rigid bikini style soft-top cover with a sufficient amount of stiffness to prevent the annoying and turbulent flapping of the soft-top at higher rates of speed when the velocity of wind is substantially increased.

2. Description of the Related Art

Convertible sports vehicles, such as the JEEP™, have become increasingly popular. These vehicles utilize an open passenger compartment that is surrounded by roll bars to protect the passengers in the event of an accident such as a vehicle being overturned. It is commonplace that JEEP enthusiasts will attach a "soft" canvas or canvas-like material top to these types of vehicles. One advantage of this type of a removable top is that the top can be easily removed as desired. The "soft" type tops require a certain amount of labor and technique in attaching and removing the tops.

The problem with fabric soft tops is that even when properly secured to the roll bars, as the speed of the vehicle increases and the speed of the wind also increases, the unsecured portions of the fabric tops will flap turbulently in the wind. As a consequence, the flapping of the fabric top is annoying and disruptive to the vehicle occupants for what should otherwise be an enjoyable relaxing drive. Currently, no product exists that prevents the upward and downward flapping motion of the fabric soft top when the vehicle is in motion.

SUMMARY OF THE INVENTION

An object of the present invention is to provide rigidity to a soft-top cover so as to prevent the annoying and turbulent flapping of the soft-top at higher rates of speed when the velocity of wind speed is increased.

With the problems and disadvantages of such conventional vehicle tops known, the present invention was conceived and one of its objectives is to provide a light weight, semi-rigid soft-top that is portable and easy to install and remove.

The durable soft-top may be constructed so that rigid members are provided to support the canvas-like material that makes up the soft-top.

The durable soft-top may include rigid members disposed adjacent to or within the material making up the durable soft-top. The durable soft-top may be rolled or folded and compactly stored. In the alternative, the durable soft-top may be constructed of a rigid accordion-like mechanism that may be extended and retracted for storage.

The durable soft-top may be constructed so that rigid support members are provided in a criss-cross pattern adjacent to the soft-top to provide support to the canvas-like material of the durable soft-top.

Yet according to another exemplary embodiment, the durable soft-top may include rigid support members whose peripheral ends are matingly secured by recesses to captivate the rigid support members under the durable soft-top in an operable fixed position.

Another aspect of this invention is to include a single piece construction for an elongated rigid member that provides support to the durable soft-top thereby preventing the turbulent flapping wind effect at higher rates of vehicle speed.

It is also objective of the present invention to provide a vehicle top which is inexpensive to manufacture and convenient for a single individual to easily attach and release from the vehicle.

It is yet another objective of the present invention to provide a semi-rigid removable vehicle top which is formed of a durable, flexible polymeric material and is relatively light in weight and convenient to store when not in use. The additional rigidity makes driving quieter since it prevents the top from flapping in the breeze. Furthermore, the life expectancy of the soft top will increase since there would be less stress on the soft top from the constant flapping in the wind.

Another aspect of this invention is to provide structure to a convention bikini-style soft-top so that water may be biased to roll off the top rather than collect on it.

These and other objects, features, and/or advantages may accrue from various aspects of embodiments of the present invention, as described in more detail below.

BRIEF DESCRIPTION OF THE DRAWINGS

Various exemplary embodiments of this invention will be described in detail, wherein like reference numerals refer to identical or similar components or steps, with reference to the following figures, wherein:

FIG. 2 illustrates a semi-rigid soft-top adapted to cover the front and rear passenger compartments for a vehicle in accordance with this invention.

FIG. 3 demonstrates the various configurations in which to orientate the rigid members according to this invention.

FIGS. 13, 14 and 15 depict an exemplary illustration of the fastening gusset according to this invention.

FIGS. 16 and 17 illustrate various configurations for the rigid members according to this invention.

FIG. 18 illustrates an illumination source incorporated onto the rigid members according to this invention.

DETAILED DESCRIPTION OF EXEMPLARY EMBODIMENTS

Particular embodiments of the present invention will now be described in greater detail with reference to the figures.

Figure 1:
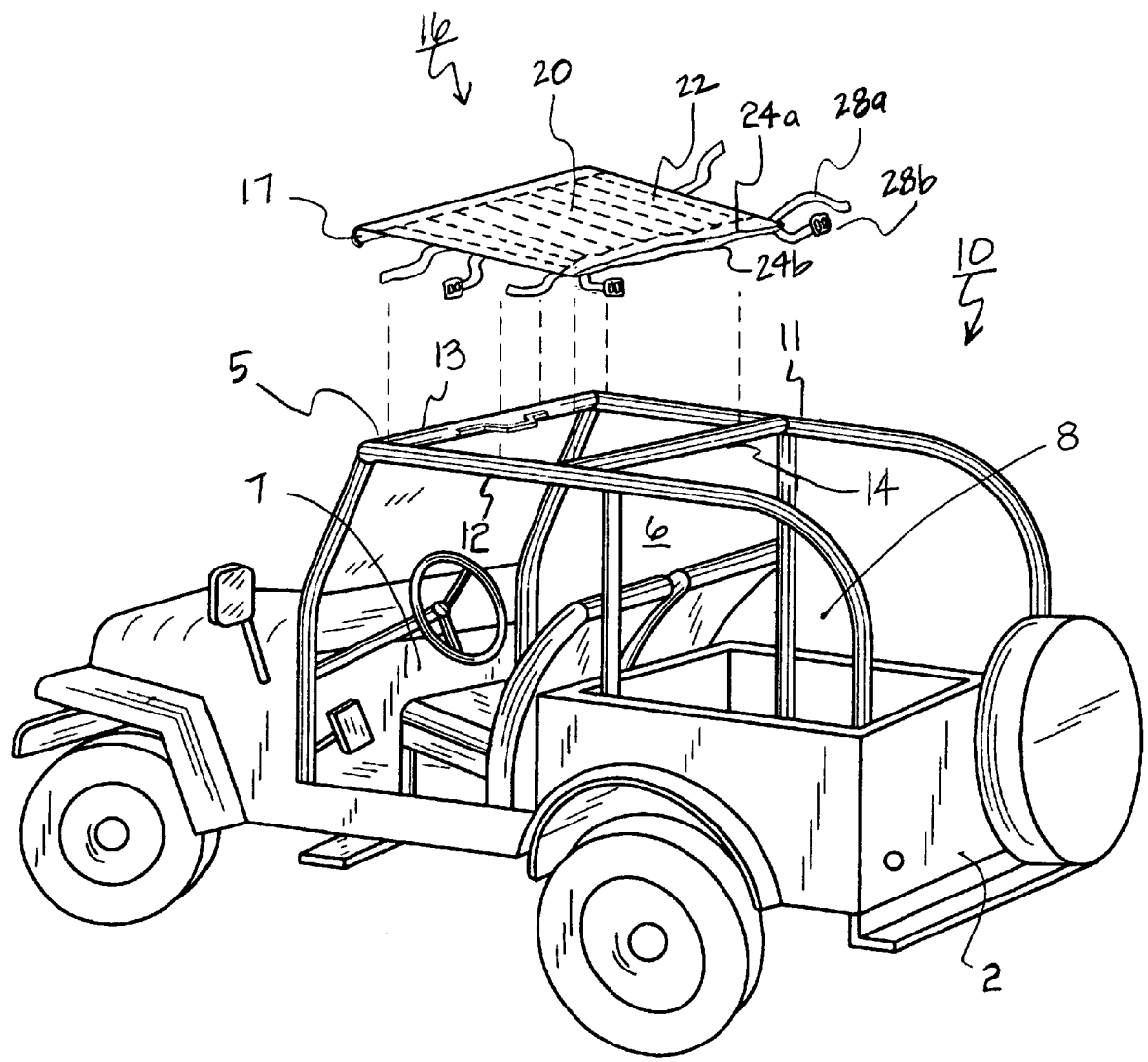
FIG. 1 illustrates a semi-rigid soft-top adapted to cover the front passenger compartment for a typical convertible sports vehicle having roll bars surrounding the passenger compartment in accordance with this invention.

FIG. 1 illustrates a convertible sports vehicle 10 having various roll bars 11, 12, 13, 14 that surround an interior passenger compartment 6 of the vehicle 10. The interior passenger compartment 6 includes a front passenger compartment 7 and a rear passenger compartment 8. In more detail, the front passenger compartment 7 of the vehicle 10 is surrounded by the right side roll bar 11, and the left side roll bar 12 joined by a front roll bar 13 and a rear roll bar 14. The rear passenger compartment 8 is surrounded by the right side roll bar 11, the left side roll bar 12, the rear roll bar 14 and the back 2 of the vehicle 10.

As shown, the right side roll bar 11 and the left side roll bar 12 extend from the front roll bar 13 to the back of the vehicle 10. The roll bars 11-14 are commonly used in various types of sports vehicles, such as the vehicle shown in FIG. 1. Conventionally, the roll bars are encased by a fabric and/or foam covering to cushion the roll bars.

As shown in FIG. 1, the durable soft top 16 is reinforced with a rigid structure. The rigid construction may be composed of at least one rigid member 22 (as shown as 55 in FIG. 19 and described later) and up to numerous rigid members 22 (e.g., as shown in FIG. 1 and FIG. 2) to provide the rigidity to the soft durable soft top 16 according to this invention. The durable soft top 16 may be made as a one-piece construction (as shown in FIGS. 1 and 5) incorporating the soft canvas-like material fabric covering and/or the durable soft top 16 may be made from an integral number of components from which the rigid members 22 and the durable soft top 16 are combined (such as shown in FIGS. 8-12).

The objective of providing at least one rigid member 22 is to reduce and/or prevent flapping of the durable soft top 16. Flapping, meaning the "upward and downward" movement of the durable soft top 16 while the vehicle 10 is in motion. In one embodiment as will be described later, the rigid member 22 is attached (by for example a hook and loop faster such as VELCRO, etc) to the durable soft top 16 which prevent the flapping of the durable soft top 16. In another embodiment described later, the rigid member 22 is disposed within a first and second layer of the durable soft top 16 and prevents the durable soft top 16 from flapping in the wind. Likewise, various other embodiments are described which are adapted to prevent the durable soft top 16 from flapping in accordance with this invention.

Figures 5, 6:
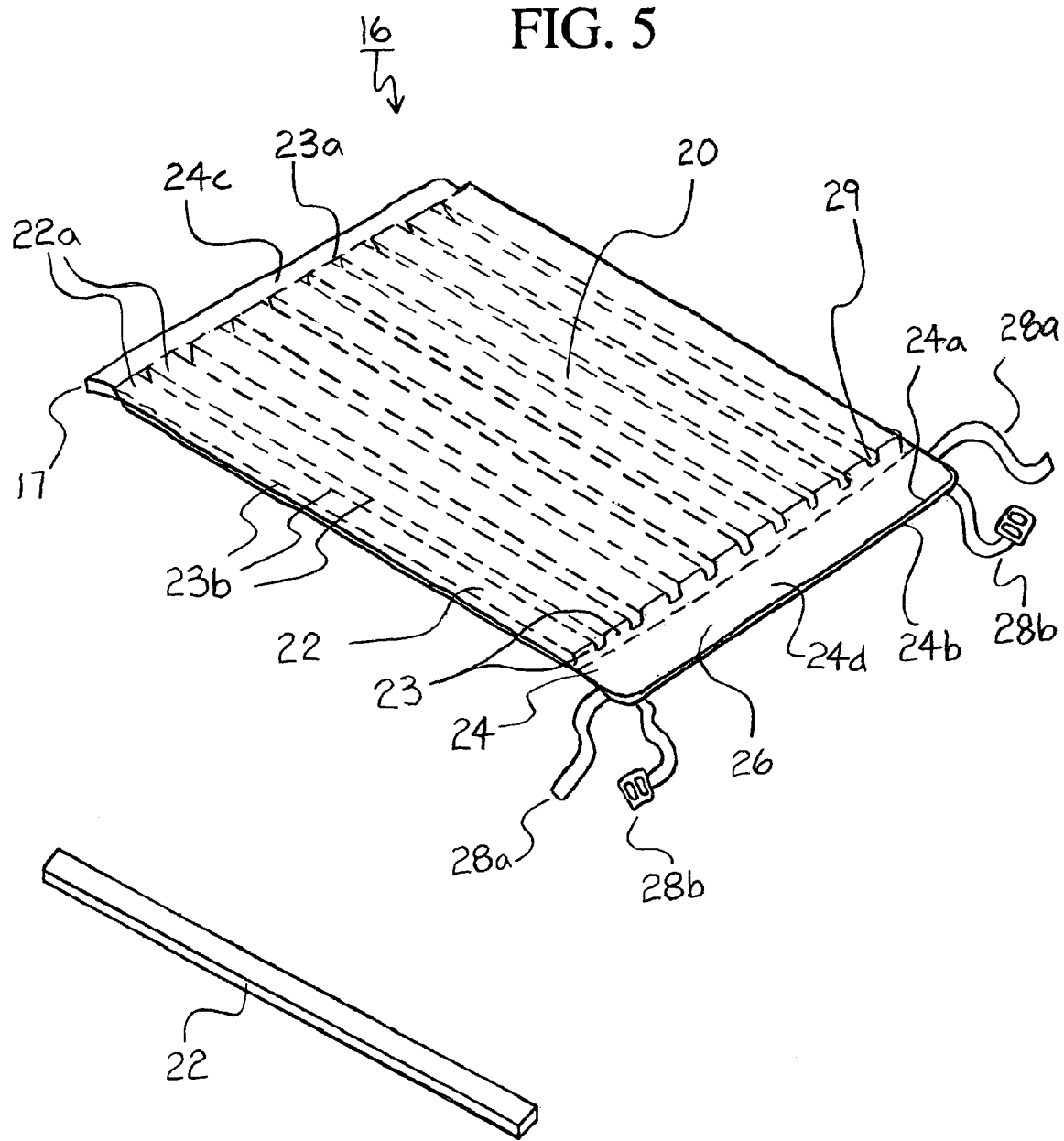
FIG. 5 depicts a perspective view of one exemplary embodiment of the semi-rigid soft-top according to this invention.
FIG. 6 illustrates a rigid member in accordance with this invention.

In FIGS. 1 and 5, a durable soft top 16 according to this invention is shown which installed covers the front passenger compartment 7 of the vehicle 10. The durable soft top 16 depicts a plurality of rigid members 22 embedded within a material fabric 24. In the alternative, and as shown in FIG. 2, the durable soft top 16 may be constructed longer to cover both the front passenger compartment 7 and the rear passenger compartments 8.

As shown in FIG. 1, the rigid members 22 may be longitudinally oriented from the front 5 of the vehicle 10 to the rear 2 of the vehicle 10 such that the ends of the rigid members 22 rest on the front roll bar 13 (or front windshield frame) and the rear roll bar 14. As demonstrated in FIGS. 2 and 3, the rigid members 22 may be longitudinally disposed in any orientation. For example, a first set of rigid members 22a may cover the front passenger compartment 7 and may be extended from the front 5 of the vehicle 10 toward the rear 2 of the vehicle 10. Another set of rigid members 22b that cover the rear passenger compartment 8 of the vehicle 10 may be disposed horizontal or perpendicular to the first set of rigid members 22a.

Various advantages may be found by staggering the first set of members 22a from the second set of rigid members 22b over various portions of the vehicle 10. For example, in FIG. 2 the rigid members 22b over the rear passenger compartment 8 are disposed perpendicular to the first set 22a to provide rigidity to the back portion of the durable soft top 16 in the instance where no roll bar may be present (see back end 18 of durable soft top 16). The rigid members 22b will provide the necessary rigidity to prevent the durable soft top 16 from lifting at the rear portion of the vehicle 10. As demonstrated in FIG. 3, the rigid members 22 may be disposed in any configuration, such as for example, vertical, horizontal, diagonal, criss-cross orientation, and/or any other type of preferred orientation in accordance with the invention.

Referring to FIG. 5, the material fabric enclosure 24 portion of the durable soft top 16 may be composed from a variety of different materials including, for example, a fabric, a canvas-like material, a vinyl, a flexible metal or polymeric material and/or any other elastic material suitable for providing rigidity to the durable soft top 16 in operation so that an individual may manually, and without assistance, easily positioned the durable soft top 16 on and off of the roll bars 11-14 independently.

According to this invention, the durable soft top 16 is portable, collapsible and relatively lightweight. The durable soft top 16 may be composed of any material and any desired thickness. According to one preferred embodiment, the material of the durable soft top 16 may be composed of a thickness of about 1/16 to 1/8 of an inch, and a length and width suitable to accommodate the dimensions of particular roll bars 11-14 on the vehicle 10. The length and width of the durable soft top 16 may be dimensioned to cover both the front interior passenger compartment 7 and the rear interior passenger compartment 8. Likewise, the durable soft top 16 may be configured to fully enclose the interior passenger compartment 6.

Figure 4:
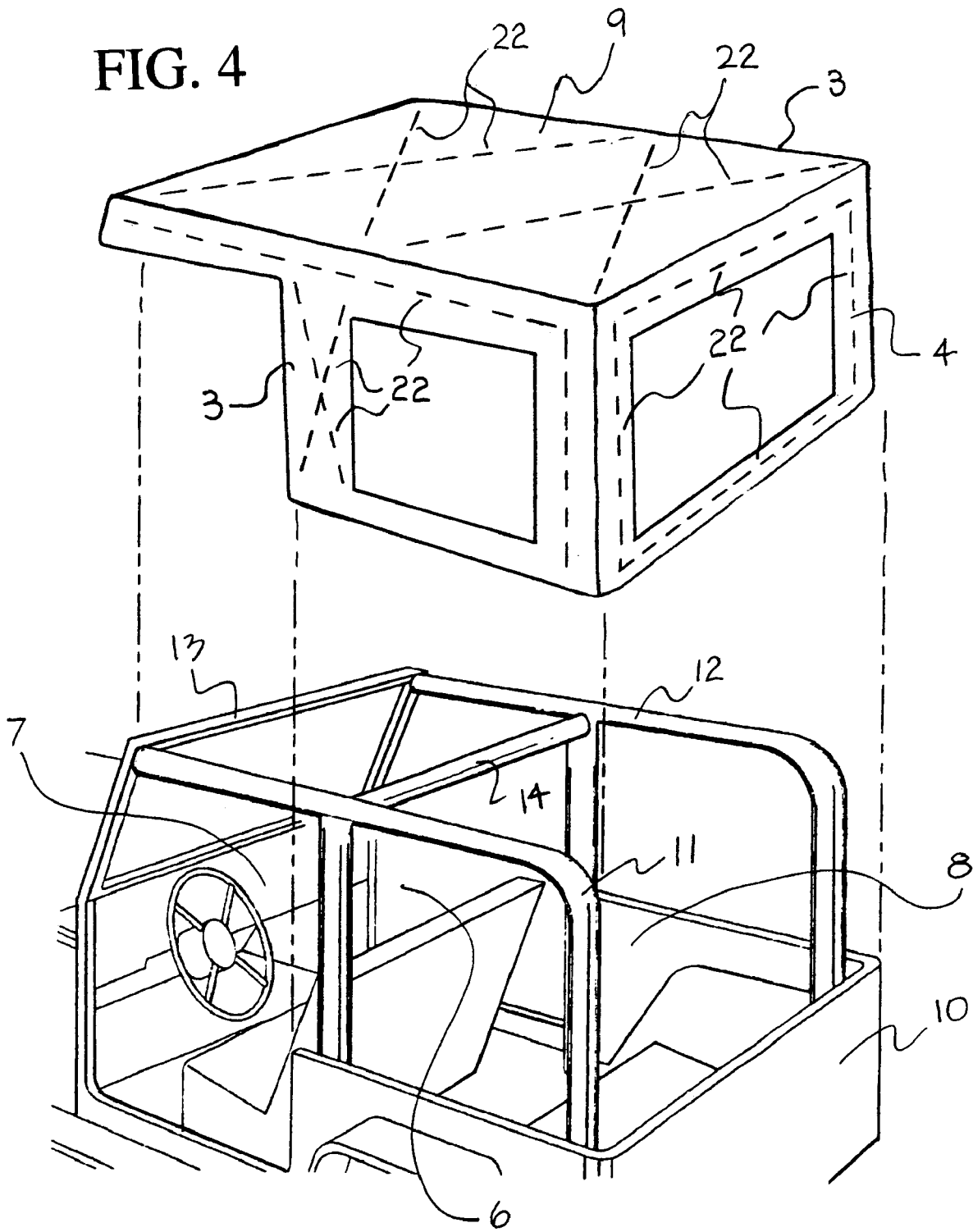
FIG. 4 illustrates a full semi-rigid soft-top cover adapted to enclose the passenger compartment of a vehicle in accordance with this invention.

FIG. 4 shows that durable soft top 16 configured as a fully enclosed top 9 to cover the entire interior passenger compartment 6. In accordance with this invention, the rigid members 22 may be disposed anywhere and in any suitable orientation on the fully enclosed top 9, including but not limited to, the sides panels 3 and rear side panel 4 as shown in FIG. 4. The rigid members 22 may be disposed within an enclosure that defines the fully enclosed top 9 and/or adjacent to the fully enclosed top 9. The objective is to enhance the rigidity throughout the fully enclosed top 9 and to reduce the turbulent effect of the wind on the fully enclosed top 9 at higher rates of speed when the velocity of the wind is increased.

In more detail, FIG. 5 shows the durable soft top 16 including at least one rigid member 22 (as shown in FIG. 6) constructed to be received within a material fabric enclosure 24. The material fabric enclosure 24 may be composed of a pair of material panels 24a. 24b. The material panel 24a is disposed on an upper side of the durable soft top 16 and a second fabric panel 24b is disposed on a lower side of the durable soft top 16. The rigid members 22 are disposed within the first material panel 24a and the second material panel 24b. The rigid members 22 provide enhanced rigidity to the durable soft top 16 and counteract the turbulent flailing motion that soft-tops experience at high vehicle rates of speed.

As shown in FIG. 5, the exemplary durable soft top 16 includes a planar central section 20. The durable soft top 16 may be fastened to the roll bars 11-14 of the vehicle 10 in a variety of different conventional constructions according to this invention. For example, at least one peripheral end (for example a first end 24c) of the durable soft top 16 may be contoured to be received by at least one channel disposed in any one of the roll bars 11-14. Alternatively, the peripheral end may be secured to the roll bars 11-14 by being tied down, bolted, latched, VELCRO, snapped with a button fastener and/or some other mechanical fastener connection that is now known or later developed in accordance with this invention.

The first end 24c of the durable soft top 16 may include a rigid material lip 17 constructed, for example, from a vinyl, a canvas-like material, a polymer, or the like. As shown in FIG. 16 (and described in more detail later), conventionally, convertible sports vehicles include a channel 47 disposed on the front windshield frame of the vehicle 10 or on the front roll bar 13 into which the lip 17 of the durable soft top 16 may be secured.

A second end 24d of the durable soft top 16 forms a sewn flap 26 onto which a pair of fastening straps 28a, 28b may be disposed. It is generally understood that fastening straps 28a, 28b may be disposed at any position along the durable soft top 16. As shown, the fastening strap 28b includes a buckle into which fastening strap 28a may be secured. A plurality of pouches 23 may be defined to receive the various rigid members 22. The pouches 23 may be constructed by each of the sides 24c, 24d of the durable soft top 16 being stitched 23a closed and longitudinal stitches 23b between the individual rigid members 22 to form the pouches 23.

In operation, the lip 17 is secured to the channel 47 (as shown in FIG. 16) in the front roll bar 13 and the pair of fastening straps 28a, 28b may be secured to the rear roll bar 14. As such, the durable soft top 16 is securely fastened to the roll bars 11-14 of the vehicle 10. The fastening straps 28a, 28b may be made of a leather, a vinyl, a canvas, a fabric strap with a buckle and/or any other mechanism for securing the fastening straps 28a, 28b to the roll bars 11-14 may be implemented in accordance with this invention.

During assembly of the durable soft top 16, the various rigid members 22 may be inserted at one end of either a first end 24c or the second end 24d of the durable soft top 16 between the first material panel 24a and second material panel 24b. Each of the rigid members 22 are received into the individual rigid member pouches 23. The various individual rigid member pouches 22a are not limited to being formed by stitching, but may be formed in a variety of different ways including being glued, welded, and the like.

In use, the durable soft top 16 may be secured to the roll bars 11-14 in the manner described above. The preferred method of positioning the durable soft top 16 to the vehicle 10 includes, for example, pressing the lip 17 of the durable soft top 16 into the channel 47 on roll bar 13. Various types of securing mechanisms may be used, which are conventionally known in the soft-top industry, such as using straps and buckles, or an arcuate end to fully engage any of the roll bars 11-14.

During installation, the durable soft top 16 may be extended and stretched from the front 5 of the vehicle 10 toward the rear 2 of the vehicle and the fastening straps 28a, 28b are extended and may be attached to the rear roll bar 14. According to the embodiment shown in FIG. 2, the durable soft top 16 is stretched and the fastening straps 28a, 28b may be attached to the left side roll bar 12 and the right side roll bar 11 respectively. Additional fastening straps may be attached to the durable soft top 16 at any preferred location on the durable soft top 16 and secured from the durable soft top 16 to any one of the roll bars 11-14. In use, the durable soft top 16 is positioned over the interior passenger compartment 6 so the occupants of vehicle 10 may enjoy a shaded and protected covering over the interior passenger compartment 6 of the vehicle 10.

To remove the durable soft top 16, an individual can manually untie or unbuckle the fastening straps 28a, 28b from the roll bars, and pull the lip 17 of the durable soft top 16 out of the captivating channel 47 (see FIG. 16) to release the lip 17 from the front roll bar 13. Thereafter, the durable soft top 16 may be stowed in a storage compartment of vehicle 10 or other storage area as desired.

Figure 7:
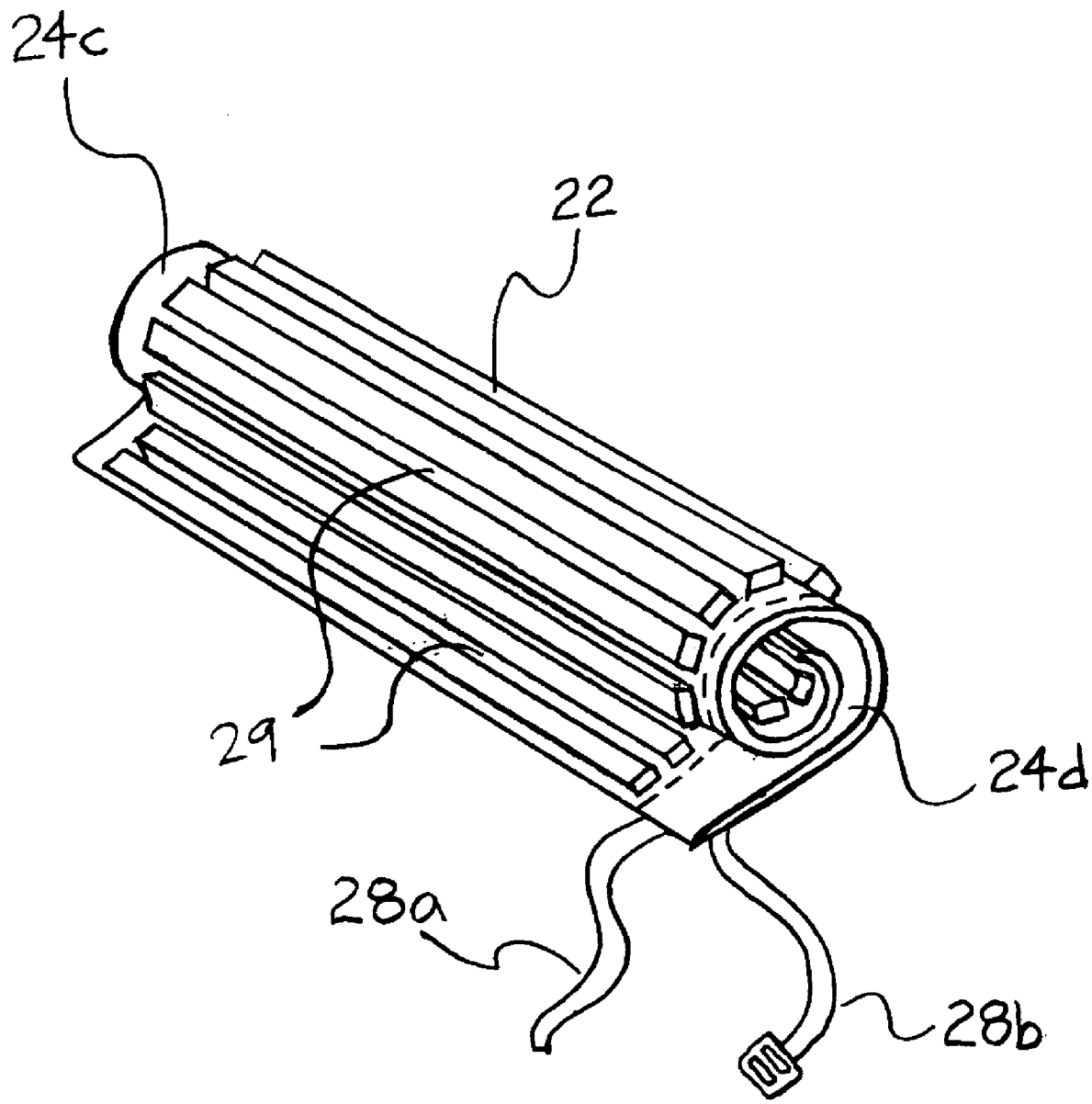
FIG. 7 illustrates a perspective view of the semi-rigid soft-top in a compact storage position in accordance with this invention.

FIG. 7 depicts the durable soft top 16 compactly rolled up for storage. As shown, the rigid members 22 are disposed between the first material panel 24a and the second material panel 24b of the durable soft top durable soft top 16. The durable soft top 16 is constructed in such a manner that flexible joints 29 are disposed between each of the rigid members pouches 23 so that the durable soft top 16 can conveniently be compactly rolled up for storage at the flexible joints 29. The stiffness of the rigid members 22 disposed internal to the durable soft top 16 provides stability so that the central planar section 20 of the durable soft top 16 does not collapse or annoyingly flap as a result of the turbulent force of the wind at increased rates of vehicle speed.

Numerous materials may be used in constructing the durable soft top 16 in accordance with this invention. For example, a polymer, a rubber, a plastic, a vinyl, a canvas-like material, cloth, metal and/or any other material now known or later discovered may be used to make up the composition of the durable soft top 16. Likewise, the design and configuration of the durable soft top 16 may be configured in a plurality of different ways.

Figure 8:
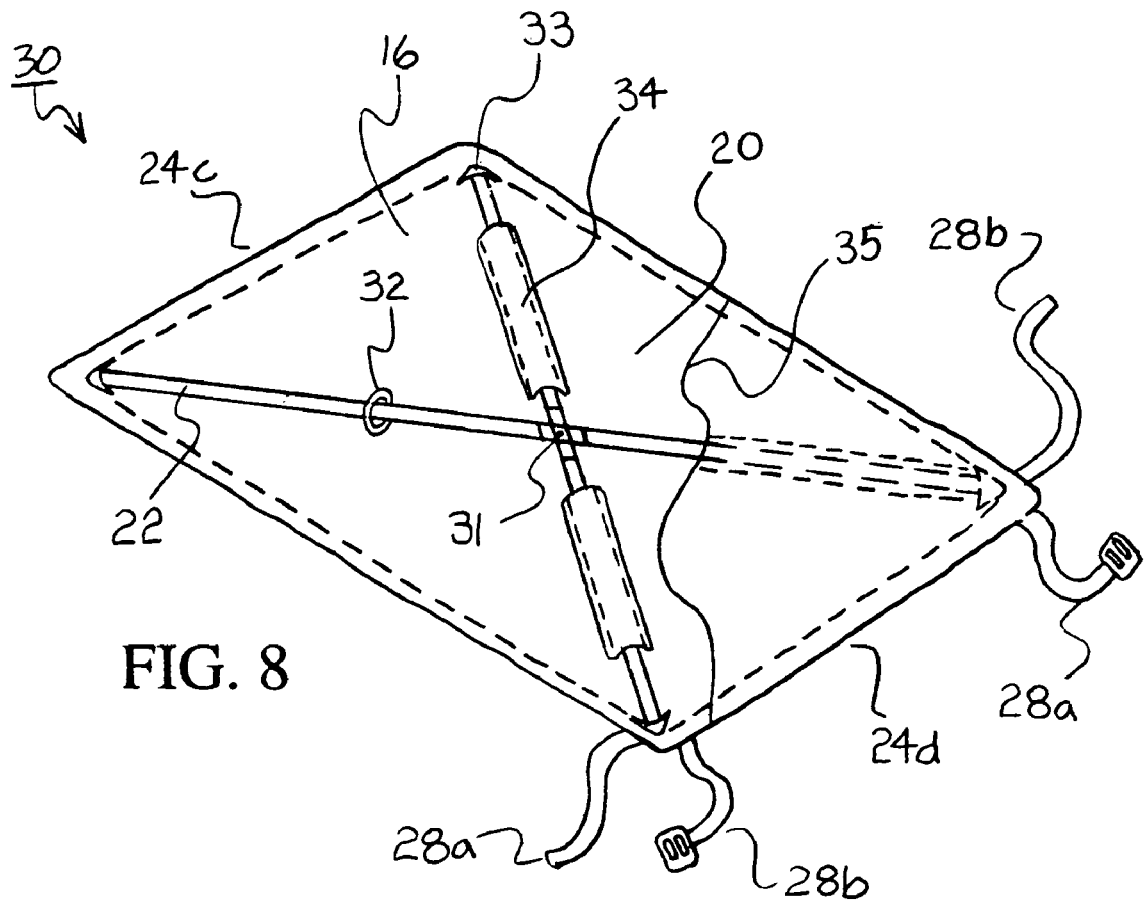
FIGS. 8 and 9 illustrate an exemplary semi-rigid soft-top collapsible criss-cross construction according to this invention.
Figure 9:
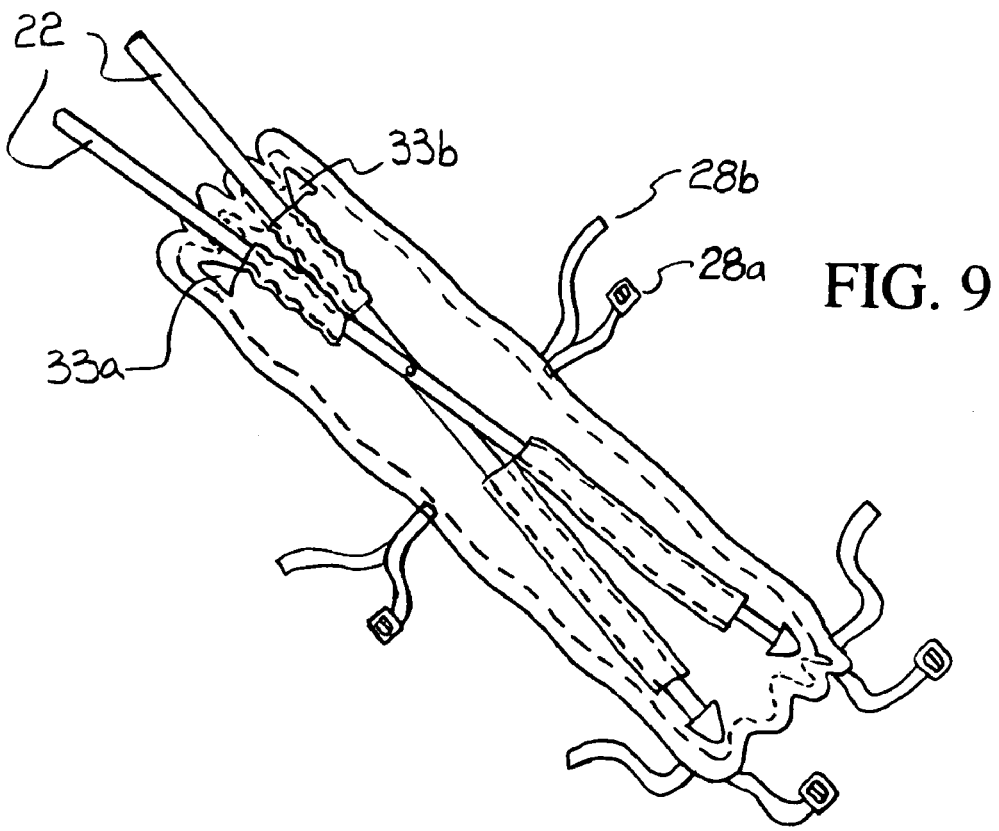

FIGS. 8 and 9 illustrate another exemplary configuration for the durable soft top 16. According to this embodiment, the rigid members 22 may be constructed in combination with the durable soft top 16 as a collapsible criss-cross support mechanism 30. As shown, the rigid members 22 are interconnected at a pivoting joint 31. The pivot joint 31 may be any number of pivoting mechanisms, such as a pin, a threaded fastener, a rivet and/or any other type of attachment for enabling one rigid member 22 to rotate relative to another rigid member 22 that is now known or later discover in accordance with this invention.

As shown, each end of the rigid members 22 may extend from one corner to an opposite corner of the durable soft top 16. At each corner, the rigid members 22 may be captivated by a gusset 33. The gussets 33 may be constructed in the shape of a triangular piece of material attached to the durable soft top 16. The gusset 33 is provided to secure the rigid members 22 and to reinforcement the rigidity of the durable soft top 16.

To provide additional support, the durable soft top 16 may include various guides to properly align the rigid members 22 against the durable soft top 16. For example, a first guide may be embodied as a ring 32 through which a rigid member 22 is disposed. Another guiding mechanism may include a sleeve 34. Alternatively, a mating material fabric 35 may be laid over the rigid members 22 and sewn against the soft durable soft top 16 to secure the rigid members 22 in place. Any combination of the guides and gussets may be provided to optimize the design of the durable soft top 16 according to this invention.

One advantage of the durable soft top 16 is that it may be collapsed and compactly stored. As shown in FIG. 9, one end of each rigid member 22 may be detached from their associated gussets 33a, 33b to release the tension applied to the durable soft top 16 in operation (as shown in FIG. 8) and the rigid members 22 may be rotated and collapsed into a compact storage position. In the storage position, the fastening straps 28a, 28b may be used to secure the durable soft top 16 into a compressed position when it is collapsed as shown in FIG. 9.

Figure 10:
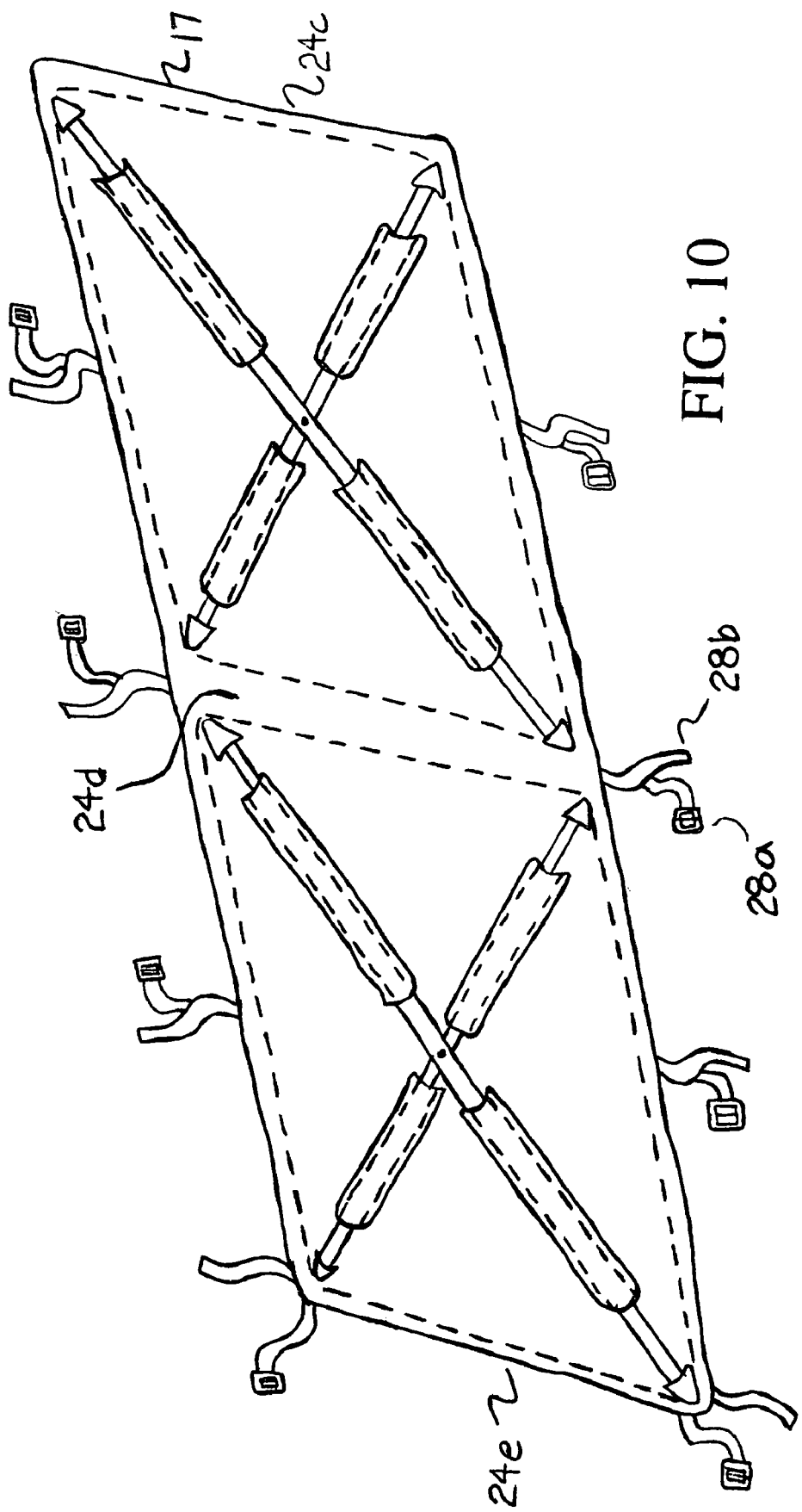
FIG. 10 illustrates the rigid soft-top collapsible criss-cross construction for both the front and rear passenger compartments of a vehicle according to this invention.

FIG. 10 illustrates an exemplary illustration of the durable soft top 16 constructed to cover both the front passenger compartment 7 and the rear passenger compartment 8 similar to the durable soft top 16 shown in FIG. 2. In particular, FIG. 10 demonstrates a dual criss-cross arrangement for the durable soft top 16 that may be attached over the front passenger compartment 7 (first end 24c to second end 24d) and the rear passenger compartment 8 (second end 24d to third end 24e) of the vehicle 10. As similarly shown in FIG. 2, the various fastening straps 28a, 28b may be attached at various preferred positions in order to secure the durable soft top 16 to the roll bars 11-14.

Figure 11:
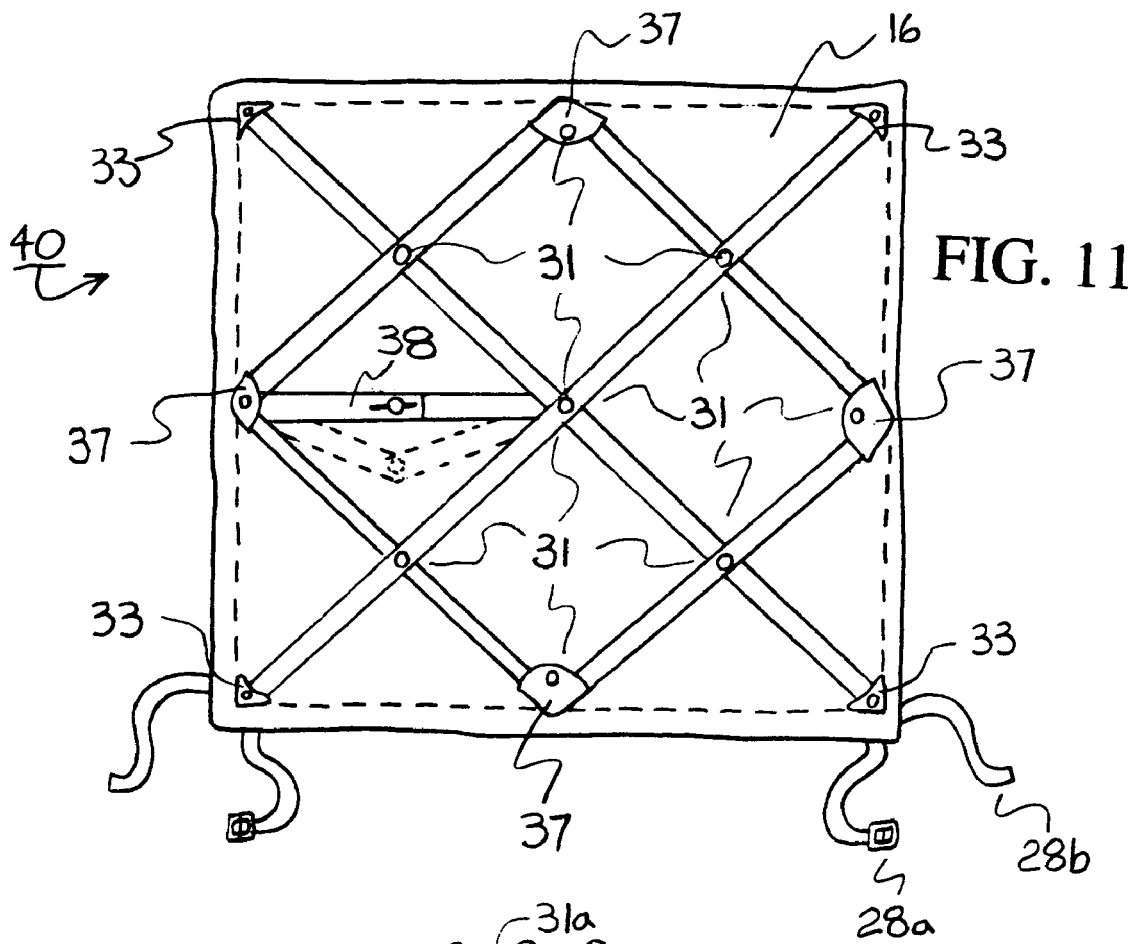
FIGS. 11 and 12 illustrate another exemplary semi-rigid soft-top collapsible accordion construction according to this invention.
Figure 12:
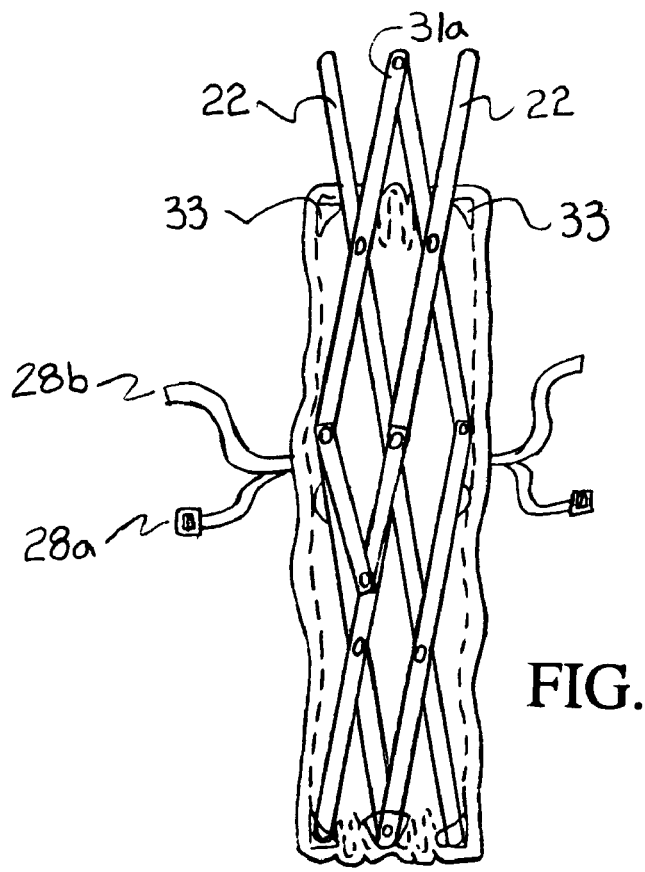

FIGS. 11 and 12 illustrate another exemplary configuration for the durable soft top 16. According to this embodiment, an arrangement of rigid members 22 may be disposed in combination with the durable soft top 16 as a collapsible accordion support mechanism 40. As shown, the rigid members 22 are pivotally connected at various pivoting joints 31 to form the accordion structure mechanism 40. In operation, the durable soft top 16 and the collapsible accordion structure mechanism 40 are extended into an open position as shown in FIG. 11. A locking mechanism 38 may be incorporated to secure the accordion structure mechanism 40 into an open position. According to this invention, various types of gussets may be used. Gussets 33 and fastening gussets 37 are integrated to fixedly brace the accordion structure mechanism 40 into an open position.

As shown in FIG. 12, to collapse the durable soft top 16 and the accordion structure mechanism 40, the locking mechanism 38 is disengaged and the two outermost rigid members 22 are released from gussets 33 as well as the uppermost central joint 31a portion is released from the uppermost fastening gusset 37. As such, the accordion structure mechanism 40 and the durable soft top 16 can then be collapsed and stowed. Likewise, in the storage position, the fastening straps 28a, 28b may be used to compactly secure the durable soft top 16 and the accordion structure mechanism 40 for safe storage as shown in FIG. 12.

FIGS. 13, 14 and 15 illustrate an exemplary fastening gusset 37 according to this invention. FIG. 13 illustrated a side view of a central joint 31a disposed within the fastening gusset 37. A pair of rigid members 22 is shown attached at a pivot joint 31. As shown in FIG. 14, the fastening gusset 37 receives the members 22 within the body of the fastening gusset 37 far enough so that a fastener 39 may be secured to retain the pair of rigid members 22.

FIG. 15 shows how the fastening gusset 37 may be configured to retain the rigid members 22 in a closed position. In particular, a first fastener portion 39a is disposed on a first side of the fastening gusset 37 and a second fastener portion 39b is disposed on a second side of the fastening gusset 37 and attached to the durable soft top 16. When the central joint 31a is positioned within the fastening gusset 37, the first fastener portion 39a and the second fastener portion 39b are secured or clasped together to captivate the rigid members 22 in a secure position. Although a button-type fastener is illustrated in this exemplary embodiment, any type of fastener may be used in accordance with this invention, such as a strap fastener, VELCRO and/or any other fastener now known or later discover in accordance with this invention.

FIGS. 16, 17 and 18 depict various exemplary configurations for the rigid members 22. A rigid member 22 may be preferably constructed in accordance with the positional orientation and the contour of the top of any one of the roll bars 11-14. For example, according to FIG. 16, a rigid member 22 is disposed to extend across from a front roll bar 13 to a rear roll bar 14. As shown, the front roll bar 13 includes a channel 47 arrangement into which the lip 17 (as shown in FIG. 5) of the durable soft top 16 may be secured.

The rigid member 22 may be adapted for use with any roll bar, channel and/or other configuration onto which the rigid member 22 will rest in the vehicle 10. As shown, the rigid member 22 is configured to matingly fit 42 within the channel end of the front roll bar 13. Likewise, at the rear end of the rigid member 22, the rigid member 22 is shown to be contoured 43 to fit over the upper rounded portion of a rear roll bar 14. When the durable soft top 16 is secured to the roll bars 11-14, the force applied to secure the soft durable soft top 16 is also translated onto the rigid members 22 and effectively secure the rigid members 22 in place on top of the roll bars 13, 14.

Alternatively, FIG. 16 illustrates incorporating an attaching mechanism 41. The attachment mechanism may be any number of mechanisms for attaching various components to each other. For example, the attaching mechanism 41 may be a VELCRO disposed between the top surface of the rigid member 22 and the bottom surface of the durable soft top 16. The attaching mechanism 41 is disposed to provide an added layer of attachment between the rigid member 22 and the soft durable soft top 16. Various types of attachment mechanisms may be employed, for example, a detachable adhesive, VELCRO, and the like. It is to be understood that the attaching mechanism 41 may disposed on the soft durable soft top 16 or on the rigid members 22.

FIG. 17 illustrates a rigid member 22 disposed between a right side roll bar 11 and the left side roll bar 12. This configuration may be visualized in FIG. 2 where the rigid member 22 is shown to be extending between the right side roll bar 11 and the left side roll bar 12. The rigid members 22 are also shown disposed adjacent to the durable soft top 16 and located horizontally over the rear passenger compartment 8. As shown, both the right side and the left side of the rigid members 22 have contoured ends 43 for receiving the curved upper portions of the roll bars 11 and 12. That is, the peripheral ends of the rigid member 22 are recessed with a curve adapted to snugly fit on top of the roll bars 11, 12. Likewise, when the durable soft top 16 is secured on top of the rigid member rigid member 22, the force applied to secure the soft durable soft top 16 is translated onto the rigid member 22 to secure the rigid members 22 in place on top of the roll bars 11, 12.

Another aspect of the invention is to construct the rigid member 22 so that at approximately the center of the rigid member 22 a raised upper surface 21 is disposed. Various advantages may be realized with the inclusion of the raised upper surface 21. The raised upper surface 21 increases the tension between the durable soft top 16 and the rigid member 22 and consequently reduces the gap between the two components making it more difficult for the durable soft top 16 to be raised any further at higher vehicle speed. Furthermore, the natural decline of the raised upper surface 21 of the rigid member 22 also promotes smooth drainage and prevents any water from building up on the top of the durable soft top 16. The raised upper surface 21 may be incorporated on any or the embodiments disclosed herein. It is also contemplated that the rigid member 22 may be bowed upward to create the raised upper surface 21.

FIG. 18 illustrates yet another embodiment in which the rigid member 22 may be adapted to receive an illumination source 44. The illumination source 44 may be a bulb, a (light emitting diode) LED or any combination of bulbs or an array of LEDs. The illumination source 44 is electrically connected to a power source. The power source may be for example, the power source from the car battery 45, such as a cigarette lighter and/or other power source in the vehicle 10. Alternatively, the power source may be an independent power source 46, such as a battery 46 electrically connected to the illumination source 44.

Figure 19:
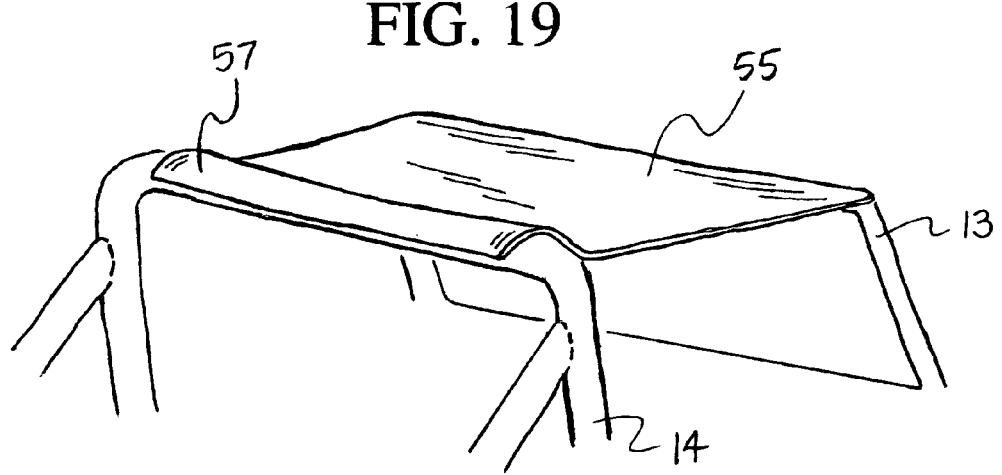
FIG. 19 illustrates a perspective view of a single piece elongated rigid member according to this invention.

FIGS. 19, 20, 21, 22 and 23 illustrate another embodiment in accordance with this invention. In particular, FIG. 19 illustrates a perspective view of an elongated rigid member 55 disposed on a vehicle. The elongated rigid member 55 may be constructed from a durable material, including for example, a polymer, a metal, a vinyl, a fiberglass, and any other now known or later discovered material in accordance with this invention. The elongated rigid member 55 may be fabricated according to a plurality of methods including for example by stamping out a mold, extruding, rolling, molding, etc.

According to this exemplary embodiment, the elongated rigid member 55 extends from the front roll bar 13 to the rear roll bar 14 position. The elongated rigid member 55 may include a contoured curved portion 57 disposed at the back portion of the elongated rigid member 55 that is adapted to be secured against the upper curvature of the rear roll bar 14. The front side of the elongated rigid member 55 may also be configured to be fastened to the channel 47 disposed on the front roll bar 13 as described above.

It is to be noted that the elongated rigid member 55 includes all of the features and functionality as described with respect to the rigid members 22 above. Likewise, it is also possible include an illumination source 44 attached to a power source 44, 45 as described in FIG. 18.

Figure 20:
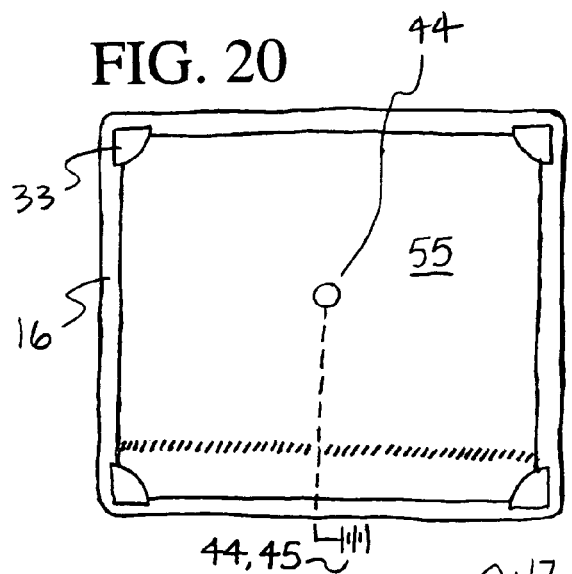
FIG. 20 shows a bottom view of the single piece elongated rigid member and durable soft arrangement top according to this invention.

FIG. 20 shows a bottom view of the elongated rigid member 55 disposed within gussets 33 of a durable soft top 16. As described previously, the elongated rigid member 55 may include an illumination source 44 electrically connected to a vehicle battery 45 and/or an independent power source.

Figure 21:
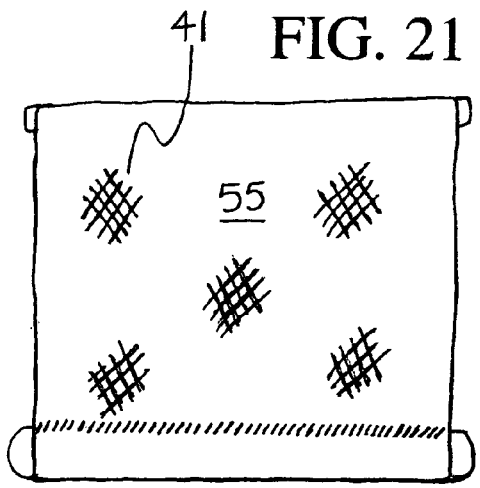
FIG. 21 depicts a top side view of the single piece elongated rigid member according to this invention.

FIG. 21 shows a top side surface view of the elongated rigid member 55 in which a fastening mechanism 41 (e.g., a hook and loop fastener, such as VELCRO) may be disposed to fasten the top of the elongated rigid member 55 to the durable soft top 16 to prevent the durable soft top 16 from lifting apart from the elongated rigid member 55 as the vehicle speed and turbulent wind speed factors increase.

Figure 22:
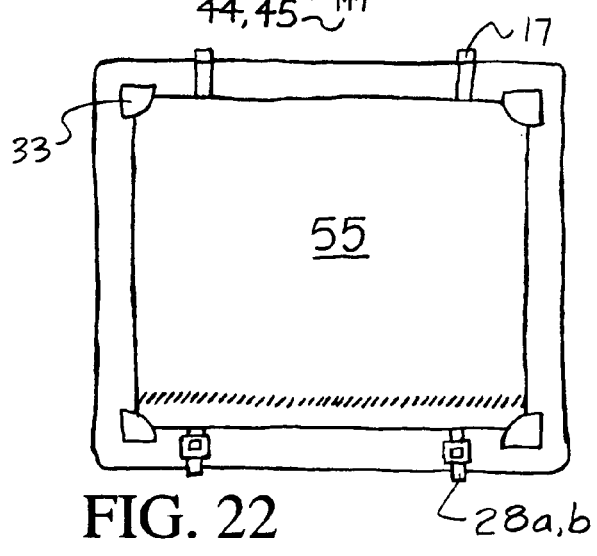
FIG. 22 illustrates a bottom view of the single piece elongated rigid member with durable soft top and securing mechanisms according to this invention.

FIG. 22 illustrates a bottom view of the single piece elongated rigid member with durable soft top 16 and securing mechanisms according to this invention. As shown, the elongated rigid member 55 may be retained by gussets 33, as well as being attached to the roll bars 13, 14 with a rigid lip 17 and fastening straps 28a, 28b.

Figure 23:
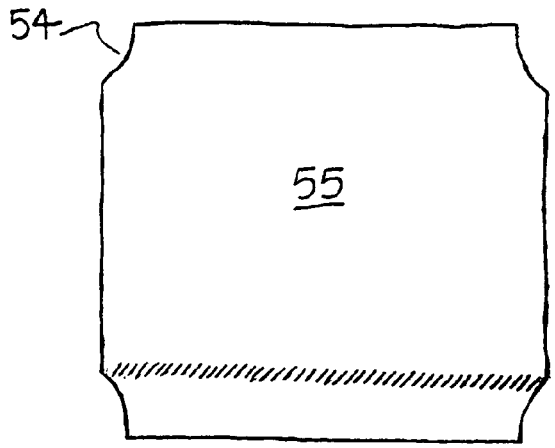
FIG. 23 illustrates another view for an alternative configuration for the single piece elongated rigid member according to this invention.

FIG. 23 illustrates another view for an alternative configuration for the single piece elongated rigid member 55 according to this invention. As shown in FIG. 23, the elongated rigid member 55 may be designed to include contoured cut-outs 54 to allow for access to fastener connections 28a, 28b and the like. It is to be understood that any number of configurations may be made within the scope of this invention.

Although described with respect to durable soft-top cover for a convertible sports vehicle, it is to be understood that this invention may be adapted as a durable soft-top cover for any passenger compartment in any type of vehicle and that it is not intended to be limited to convertible sports vehicles.

The illustrations and examples provided herein are for explanatory purposes and are not intended to limit the scope of the appended claims. It will be recognized by those skilled in the art that changes or modifications may be made to the above described embodiment without departing from the broad inventive concepts of the invention. It is understood therefore that the invention is not limited to the particular embodiment which is described, but is intended to cover all modifications and changes within the scope and spirit of the invention.

What is claimed:

1. A durable cover extending over top of a passenger compartment comprising:
    a flexible panel comprising a first upper layer and a second lower layer; and
    at least one rigid member disposed between the first upper layer and the second lower layer of the flexible panel that extends across a central portion of a planar region,
    wherein ends of the least one rigid member disposed within the first upper layer and the second lower layer spans between, and rests on the second lower layer, which rests on an upper edge of a windshield and a rear support in the passenger compartment, wherein a combined width of the at least one rigid member covers a majority of the passenger compartment and provides rigidity to the substantially planar region of the flexible panel to reduce a turbulent wind effect on the durable cover by preventing an upward and downward flapping motion of the flexible panel.

2. The durable cover as recited in claim 1, wherein the durable cover is comprised of a plurality of rigid members embedded within the first upper layer and the second lower layer of the flexible panel that are arranged between the upper edge of the windshield and the rear support.

3. The durable cover as recited in claim 1, wherein the length and width of the durable cover is dimensioned to cover both a front interior passenger compartment and a rear interior passenger compartment.

4. The durable cover as recited in claim 1, wherein the durable cover fully encloses the interior passenger compartment that comprises a roof portion, a rear portion, and a pair of side portions, wherein the durable cover is detachably coupled to the upper edge of the windshield and extends rearward over the interior passenger compartment.

5. The durable cover as recited in claim 1, wherein the flexible panel includes a securing mechanism that is adapted to secure the flexible panel to upper edge of the windshield, the rear supports and other supports in at least one of the following ways: by tie downs, bolted, latched, hook and loop fastener, snapped with a button fastener, and a mechanical fastener connection.

6. The durable cover as recited in claim 1, wherein a first end of the flexible panel includes a rigid material lip adapted to mate with a channel in the upper edge of the windshield frame.

7. The durable cover as recited in claim 1, wherein the durable cover includes at least one pouch adapted to receive the at least one rigid member, wherein the pouch is formed in between the first upper and second lower layers and the opening to the pouch is formed by a pair of seams that extend longitudinally across the central portion of the planar region of the durable cover.

8. The durable cover as recited in claim 7, wherein the seams disposed between a pair of rigid members are constructed as flexible joints allowing adjacent rigid members to bend in side-by-side relation to each other.

9. The durable cover as recited in claim 1, wherein a pair of rigid members are interconnected at a pivoting joint and arranged as a collapsible criss-cross support member, and wherein ends of the rigid members are extended to support the edges of the flexible panel.

10. The durable cover as recited in claim 1, wherein a gusset is disposed to receive and align the end of the rigid member against the flexible panel, and wherein the gusset further includes a fastener adapted to secure an end of the rigid members.

11. The durable cover as recited in claim 1, wherein a guide is provided to receive and align the rigid member against the flexible panel, and wherein the guide may be selected from at least one of a ring and a sleeve.

12. The durable cover as recited in claim 1, wherein a collapsible accordion criss-cross member having a locking mechanism is provided to structurally support the flexible panel.

13. The durable cover as recited in claim 1, wherein the ends of the rigid member includes contoured ends, wherein
a first end is contoured to be mounted onto the upper edge of the windshield, and
a second end is contoured to be mounted onto the rear support.

14. The durable cover as recited in claim 13, wherein
the first end of the rigid member includes a channel portion adapted to mate with a channel on the upper edge of the windshield, and
the second end of the rigid member includes a concave arc adapted to mate with a curved surface of the rear support.

15. The durable cover as recited in claim 1, wherein the rigid member includes an attachment mechanism disposed between the top surface of the rigid member and the bottom surface of the durable cover.

16. The durable cover as recited in claim 1, wherein at approximately the center of the rigid member, an upper surface of the rigid member is raised to a slight mid-peak shape to increase the tension between the durable cover and the upper surface of the rigid member.

17. The durable cover as recited in claim 1, wherein the rigid member is adapted to receive an illumination source electrically connected to a power source.

18. A durable cover extending over top of a passenger compartment comprising:
a flexible panel including a first upper layer and a second lower layer; and
a plurality of rigid members disposed in pouches formed between the first layer and the second layer of the flexible panel,
wherein a combined width of the plurality of rigid members extend across a central portion of a planar region and cover a majority of the passenger compartment, and
wherein ends of the plurality of rigid members disposed within the first upper layer and the second lower layer span between, and rests on the second lower layer, which rests on an upper edge of a windshield and a rear support in the passenger compartment.

* * * * *